May 10, 1949.   W. D. COCKRELL   2,469,860
CONTROL DEVICE
Filed Dec. 8, 1944
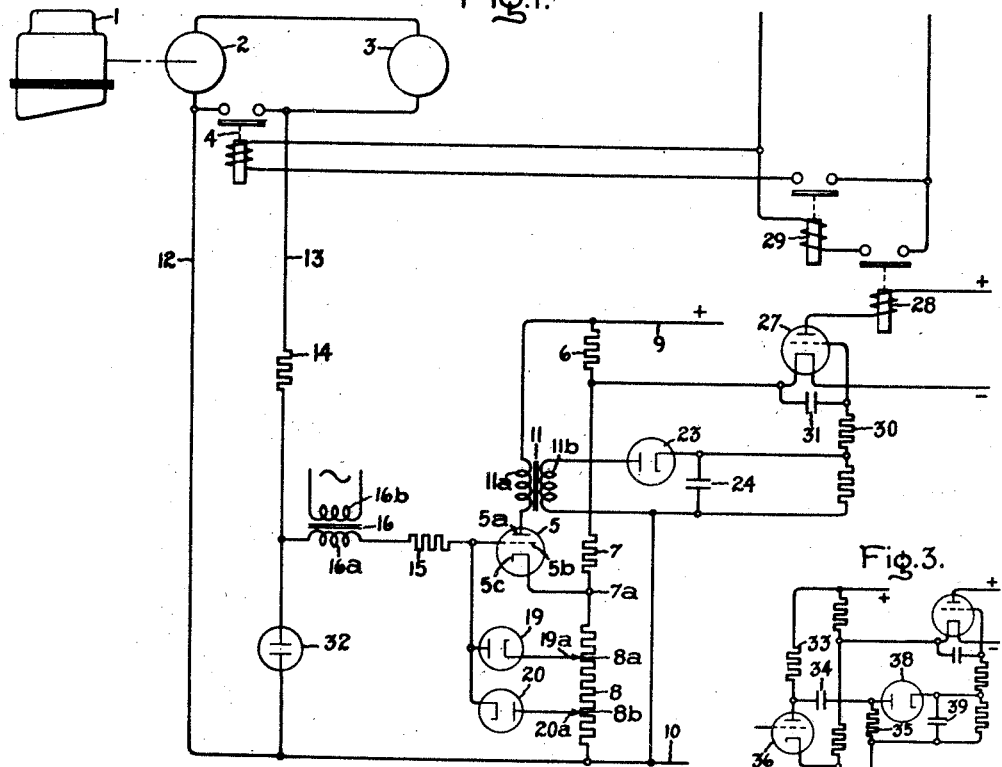
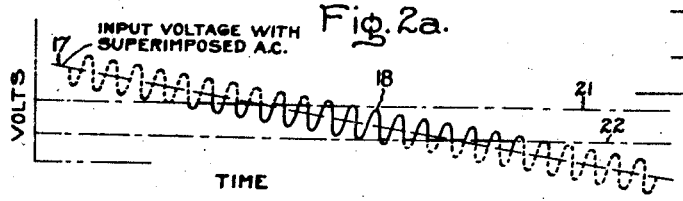
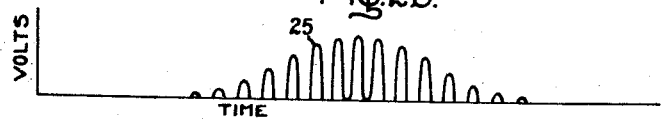
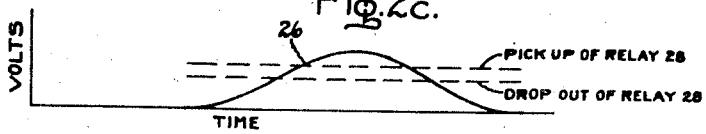
Inventor:
William D. Cockrell,
by Harry E. Dunham
His Attorney.

Patented May 10, 1949

2,469,860

UNITED STATES PATENT OFFICE 2,469,860

CONTROL DEVICE

William D. Cockrell, Schenectady, N. Y., assignor to General Electric Company, a corporation of New York Application December 8, 1944, Serial No. 567,302

5 Claims. (Cl. 175—375)

This invention relates to control devices, more particularly to electronic relaying control devices, and it has for an object the provision of a simple, reliable, inexpensive and improved control device of this character.

The invention is advantageous in initiating controlling operations in response to signal voltages within a narrow range and in preventing the initiation of such controlling operation when the magnitude of the signal voltage is outside such range. For example, it may be desired to close the contacts of a switching device, such as a large electromagnetic contactor only when the voltage across its contacts is within a narrow range of values.

In carrying the invention into effect in one form thereof, an electric valve having an input circuit and output circuit which is adapted to be connected to a source of direct voltage is provided. A direct signal voltage which may be subject to variation throughout a wide range of values is applied to the input circuit, and means are provided for superimposing a relatively low magnitude periodically varying voltage on the direct signal voltage. A rectifier is connected across the input circuit to conduct current in response to an input circuit voltage in excess of a predetermined maximum value. This renders the valve unresponsive to the superimposed periodically varying voltage. For input circuit voltages less than the predetermined minimum value at which the rectifier becomes conducting, a periodically varying current flows in the output circuit. The output current comprises a direct component upon which is superimposed an alternating component. A device is connected in the output circuit which separates the alternating component from the output current and this component is utilized to initiate a controlling operation.

In an extension of the invention, a reversely connected rectifier is connected across the input circuit which becomes conducting when the input circuit voltage decreases below a predetermined minimum value so that the valve is unresponsive to the superimposed periodically varying voltage. Thus a periodically varying current is caused to flow in the output circuit to initiate controlling operation only for values of the direct signal voltage between the predetermined maximum and minimum values of the range.

For a better and more complete understanding of the invention, reference should now be had to the following specification and to the accompanying drawings of which Fig. 1 is a simple diagrammatical sketch of an embodiment of the invention, and Figs. 2a, 2b and 2c are charts of characteristic curves which facilitate an understanding of the operation. Fig. 3 is a modification of Fig. 1.

In illustrating the invention in one form thereof, it is shown as applied to control the closing of a switch in a loop circuit which includes the armatures of a motor and a generator which is driven by an internal combustion engine that is undergoing tests.

Referring now to the drawing, an internal combustion engine 1 is connected to drive the generator 2, and the armature of the motor 3 is arranged to be connected in a loop circuit with the armature of the generator 2 by suitable means such as an electromagnetically operated contactor 4. In the carrying out of certain tests on the engine, such as a pump back test, it is desired to prevent the closing of the contacts of contactor 4 when the voltage across the contacts exceeds a predetermined value or when the polarity of such voltage is incorrect.

The control device for controlling this operation comprises an electric valve 5 having an anode 5a a control grid 5b, and a cathode 5c. A voltage divider comprising resistors 6, 7 and 8 is connected across a source of direct voltage which is represented by the conductors 9 and 10. The conductor 9 constitutes the positive side of the source and conductor 10 is the negative side of the source. The anode 5a is connected through the primary winding 11a of a transformer 11 to the positive conductor 9 and the cathode 5c is connected to the relatively negative intermediate point 7a of the voltage divider. The direct voltage across the contacts of the contactor 4 is utilized as a signal voltage. This direct signal voltage is supplied to the input circuit of the valve 5 by means of conductors 12 and 13. As shown the conductor 12 is connected to the conductor 10 which is the negative side of the source and the conductor 13 is connected through relatively high resistances 14 and 15 to the grid 5b. The resistance 14 may be of the order of .5 megohm and the resistor 15 may be of the order of .25 megohm.

A periodically varying voltage is superimposed upon the direct signal voltage by means of a transformer 16 of which the secondary winding 16a is connected in the grid circuit of valve 5 and the primary winding 16b is connected to a suitable source of alternating voltage such as a 60 cycle commerical source. The transformer 16 is a stepdown transformer and the turn ratio of the primary and secondary windings is such that the secondary voltage has a relatively low value, for example one volt peak to peak.

The direct signal voltage is represented by the straight line curve 17 in Fig. 2a and the superimposed alternating voltage is represented by the sinusoidal curve 18. The slope of the curve 17 indicates that the direct signal voltage varies through a relatively wide range of values of which only a small portion is illustrated in Fig. 2a. In the application illustrated in Fig. 1, the direct signal voltage may vary between values of plus 700 volts and minus 700 volts.

For the purpose of preventing the response of the valve 5 to the superimposed alternating voltage when the total grid voltage exceeds a predetermined value, a rectifier 19 is connected between the grid 5b and a point 8a on the section 8 of the voltage divider. The value of the voltage at this point is such that when the grid voltage exceeds the predetermined value, the valve 19 conducts. As a result, nearly all of the alternating voltage is absorbed by the high resistance resistor 15. In other words, as far as the alternating voltage is concerned, the grid 5b is directly tied to the point 8a of the voltage divider when the rectifier 19 is conducting. Consequently, the valve 5 does not respond to the alternating voltage.

In order to prevent the response of valve 5 when the total grid voltage is less than a predetermined value, a reversely connected rectifier 20 is connected between the grid 5b and a point 8b on the section 8 of the voltage divider. The voltage of this point is such that the rectifier conducts when the grid voltage falls below a predetermined minimum value.

If it is desired to prevent the closing of the contactor 4 when the voltage across its contacts exceeds two volts, which value is represented by the horizontal line 21 in Fig. 2a, the slider 19a is adjusted to a point on resistor 8 of which the voltage is such that the rectifier becomes conducting at the predetermined grid voltage which corresponds to two volts across the contacts of the contactor 4. Similarly, if it is desired to prevent the closing of the contactor when the voltage across its contacts is less than one volt, as represented by the horizontal line 22 in Fig. 2a, or when this voltage is of reverse polarity, the slider 20a is adjusted to a point of corresponding voltage on the resistor 8.

Thus, valve 5 is responsive to the superimposed alternating voltage only when both rectifiers 19 and 20 are non-conducting. In other words, valve 5 is responsive only to the solid line portion of the alternating voltage curve 18 and consequently operation is possible only in the narrow band of signal voltages which is included between the predetermined maximum and minimum values represented by the horizontal lines 21 and 22.

The rectifiers 19 and 20 may be of any suitable type such, for example, as the well known copper oxide rectifier or a high vacuum valve type rectifier. It is preferred to employ high vacuum valve type rectifiers which are included in the same envelope with the valve 5. This construction results in a "fail safe" feature of the relay since if the tube fails, operation of any of the subsequent control apparatus is prevented.

When both rectifiers 19 and 20 are non-conducting, the valve 5 is conducting a periodically varying current in its output circuit, and alternating voltage is induced in the secondary winding 11b of the transformer. This alternating voltage is rectified by the diode valve 23 and is applied to charge the capacitor 24. The rectified voltage is represented by the discontinuous curve 25 in Fig. 2b and the integrated voltage across the capacitor 24 is represented by the continuous curve 26 in Fig. 2c.

This integrated voltage is applied to the control grid of a power valve 27 which operates an electromagnetic switching device 28 which in turn controls the operation of the contactor 4 either directly or indirectly through a relaying contactor 29 if the contactor is of such size that the contacts of relay 28 are unable to handle the coil current.

A resistor 30 having a resistance of the order of .25 megohm is included between the grid and cathode of the power valve 27.

With the foregoing understanding of the elements and their organization, the operation of the control device will readily be understood from the following description.

If the voltage of the grid 5b exceeds the predetermined maximum limit represented by the horizontal line 21, the rectifier 19 is conducting or if the grid voltage is less than the predetermined minimum value represented by the horizontal line 22, the rectifier 20 is conducting. In either event, no periodically varying current flows through the primary winding in the output circuit of the valve 5. Consequently, the power valve 27 is non-conducting and the relay 28 and contactors 29 and 4 remain open.

However, when the magnitude of the direct signal voltage is such that the grid voltage is between the predetermined maximum and minimum values, the rectifiers 19 and 20 are non-conducting and a periodically varying current flows in a primary winding 11a in the output circuit of the valve 5. As a result, an alternating voltage is induced in the secondary winding, rectified and applied to charge the capacitor 24. At a predetermined value of voltage across capacitor 24, the power valve 27 becomes conducting. In response to current conducted by the power valve, the electromagnetic switching device 28 and the contactor 29 are successively energized and closed. Responsively to the closing of the contacts of contactor 29, the contactor 4 is energized and closed.

The circuit in which the capacitor 31 is included i. e., the circuit through resistors 2, 8 and 30, is designed to have a time constant sufficient to prevent firing of the power valve 27 in response to a transient fluctuation of the direct signal voltage. In other words, the magnitude of the direct signal voltage must pass through the operating range at a rate which is less than a maximum predetermined rate in order to fire the power valve.

To prevent the protective resistor 15 and the rectifiers 19 and 20 from having to conduct comparatively large currents when a high signal voltage is impressed on the circuit, a glow lamp voltage regulator valve 32 is inserted in the input circuit with the protective resistor 14 so that at voltages in excess of 60 to 70 volts, this glow lamp becomes conducting and any voltage in excess of this value is absorbed in the large protective resistor 14. In this way, direct voltages of the order of 1000 volts can be handled continuously.

The modification of Fig. 3 is the same as the modification of Fig. 1 with the exception that the transformer 11 of Fig. 1 is replaced by a resistor 33, a capacitor 34 and a resistor 35. The resistor 33 is connected in the output circuit of the valve 36 which corresponds to the valve 5 of Fig. 1. The capacitor 34 and the resistor 35 are connected in series between the anode of the valve 36 and the negative conductor 37 which corresponds to the negative conductor 10 of Fig. 1.

The direct component of the current in the output circuit of valve 36 produces a direct voltage across resistor 33. The alternating component produces an alternating voltage across resistor 33. The direct component does not pass through the capacitor 34 but the alternating current component does pass through and consequently an alternating voltage appears across resistor 35. This alternating voltage is rectified by the diode rectifier valve 38 which corresponds to the diode rectifier valve 23 of Fig. 1. The rectified voltage is applied to charge the capacitor 39 which corresponds to the capacitor 24 of Fig. 1. From this point on, the operation is identical with the operation of the system of Fig. 1.

Although in accordance with the provisions of the patent statutes, this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of the invention or from the scope of the annexed claims.

What I claim as new and desire to secure by Letters Patent of the United States, is:

1. In combination, an electric valve having an anode, a cathode and a control grid, a voltage divider having terminals for connection to a source of direct voltage, connections from the anode and cathode of said valve to said voltage divider, means for supplying to the grid cathode circuit of said valve a direct signal voltage having a relatively wide range of values, means for superimposing on said signal voltage a periodically varying voltage of relatively low magnitude, thereby to cause a current having a periodically varying component to flow in said output circuit, means responsive to said periodically varying component to initiate a controlling operation, and means for rendering said valve unresponsive to said periodically varying voltage when the magnitude of said signal voltage is outside a relatively narrow range of values having a predetermined maximum value and a predetermined minimum value comprising a rectifier valve connected from said grid to a point of constant voltage on said divider to render said rectifier conducting in response to a grid voltage in excess of said maximum value and a reversely connected rectifier connected from said grid to a different point of constant voltage on said divider to render said reversely connected valve conducting in response to a grid voltage less than said minimum value.

2. In combination, an electric valve having an anode, a cathode and a control grid, a voltage divider, means for supplying a direct voltage to said divider, connections from the anode and cathode of said valve to said divider, a transformer having its primary winding connected in the anode-cathode circuit of said valve, means for supplying to the grid of said valve a direct signal voltage having a relatively wide range of values, means for superimposing a periodically varying voltage on said direct signal voltage thereby to produce a periodically varying current in the anode-cathode circuit of said valve, means for rendering said valve unresponsive to said periodically varying voltage when said direct signal voltage is outside a relatively narrow range of values having a predetermined maximum value and a predetermined minimum value comprising a rectifier connected from said grid to a point of constant voltage on said divider to render said rectifier conducting in response to a grid voltage in excess of said maximum value and a reversely connected rectifier connected from said grid to a point of constant voltage on said divider to render said reversely connected rectifier conducting in response to a grid voltage less than said minimum value, means for rectifying the secondary voltage of said transformer, and an electromagnetic switching device connected to be responsive to said rectified voltage.

3. In combination an electric valve having an anode, a cathode and a control grid, a source of direct voltage of constant value, a voltage divider connected across said source, connections from the anode and cathode of said valve to points on said divider, means for supplying to the grid cathode circuit of said valve a direct signal voltage having a relatively large range of values, means for superimposing on said signal voltage a periodically varying voltage of a magnitude that is relatively low in comparison with the maximum values of said signal voltage, thereby to cause a current having a periodically varying component to flow in said output circuit, means responsive to said periodically varying component to initiate a controlling operation, and means for rendering said valve unresponsive to said periodically varying voltage when the magnitude of said signal voltage is outside a relatively narrow range of values having a predetermined maximum value and a predetermined minimum value comprising a rectifier valve connected from said grid to a point on said divider to render said rectifier conducting in response to a grid voltage in excess of said predetermined maximum value, and a reversely connected rectifier connected from said grid to a different point on said divider to render said reversely connected valve conducting in response to a grid voltage less than said minimum value.

4. In combination, an electric valve having an anode, a cathode and a control grid, a source of direct voltage of constant value, a voltage divider connected across said source, connections from the anode and cathode of said valve to points on said divider, means for supplying to the grid cathode circuit of said valve a direct signal voltage having a relatively large range of values, means for superimposing on said signal voltage a periodically varying voltage of a magnitude that is relatively low in comparison with the maximum values of said signal voltage, thereby to cause a current having a periodically varying component to flow in said anode-cathode circuit, a second electric valve provided with an input circuit and an output circuit, means including a rectifier responsive to said periodically varying component for supplying a direct voltage to the input circuit of said second valve to vary the current in said output circuit to initiate a controlling operation, and means for rendering said first valve unresponsive to said periodically varying voltage when the magnitude of said signal voltage is greater than a first predetermined value or less than a second predetermined value comprising a rectifier valve connected from said grid to a point on said divider to render said rectifier valve conducting in response to a grid voltage greater than said first predetermined value, and a reversely connected rectifier connected from said grid to a different point on said divider to render said reversely connected valve conducting in response to a grid voltage less than said second predetermined value.

5. In combination, an electric valve having an anode, a cathode and a control grid, a source of direct voltage of constant value, a voltage divider connected across said source, connections from the anode and cathode of said valve to points on said divider, a switching device having a pair of normally open contacts, means for supplying across said contacts a direct voltage having a relatively large range of values, connections for deriving from said contact voltage a direct signal voltage having a relatively large range of values and for supplying said signal voltage to the grid cathode circuit of said valve, means for superimposing on said signal voltage a periodically varying voltage of a magnitude that is relatively low in comparison with the maximum values of said signal voltage, thereby to cause a current having a periodically varying component to flow in the anode-cathode circuit of said valve, a second electric valve provided with an input circuit and an output circuit, a circuit connection from the anode circuit of said first valve to the negative terminal of said divider, a capacitor and a resistor connected in series in said circuit connection for producing an alternating voltage across said resistor in response to said periodically varying component, means including a rectifier responsive to said alternating voltage for supplying a direct voltage to the input circuit of said second valve to effect a variation in the current in said output circuit, means responsive to said variation in current to actuate said switching device to close said contacts, and means for rendering said first valve unresponsive to said periodically varying voltage when the magnitude of said signal voltage is outside a narrow range between a first predetermined value and a second predetermined value comprising a rectifier valve connected from said grid to a point on said divider to render said rectifier valve conducting in response to a grid voltage greater than said first predetermined value, and a reversely connected rectifier valve connected from said grid to a different point on said divider to render said reversely connected valve conducting in response to a grid voltage less than said second predetermined valve thereby to prevent said switching device from closing said contacts in response to signal voltages outside the narrow range between said first and second predetermined values.

WILLIAM D. COCKRELL.

REFERENCES CITED

The following references are of record in the file of this patent:

UNITED STATES PATENTS

| Number | Name | Date |
| --- | --- | --- |
| 2,144,995 | Pulvermacher | Jan. 24, 1939 |
| 2,171,918 | Dilenberger | Sept. 5, 1939 |
| 2,275,930 | Torchenx | Mar. 10, 1942 |
| 2,363,985 | Moser | Nov. 28, 1944 |